(12) United States Patent
En Gad et al.

(10) Patent No.: US 12,437,788 B2
(45) Date of Patent: Oct. 7, 2025

(54) SYNDROME DECODING SYSTEM

(71) Applicant: Micron Technology, Inc., Boise, ID (US)

(72) Inventors: Eyal En Gad, Highland, CA (US); Leon Zlotnik, Camino, CA (US); Yoav Weinberg, Thornhill (CA)

(73) Assignee: Micron Technology, Inc., Boise, ID (US)

( * ) Notice: Subject to any disclaimer, the term of this patent is extended or adjusted under 35 U.S.C. 154(b) by 139 days.

(21) Appl. No.: 18/523,366

(22) Filed: Nov. 29, 2023

(65) Prior Publication Data

US 2024/0185898 A1 Jun. 6, 2024

Related U.S. Application Data

(60) Provisional application No. 63/429,699, filed on Dec. 2, 2022.

(51) Int. Cl.
*G11C 7/10* (2006.01)
*G06F 11/10* (2006.01)

(52) U.S. Cl.
CPC ........ *G11C 7/1012* (2013.01); *G06F 11/1068* (2013.01); *G11C 7/1039* (2013.01)

(58) Field of Classification Search
CPC ..... G11C 7/1012; G11C 7/1039; G11C 29/12; G11C 7/1006; G06F 11/1068; G06F 11/1048

USPC ................................................. 365/230.06
See application file for complete search history.

(56) References Cited

U.S. PATENT DOCUMENTS

| | | | |
|---|---|---|---|
| 6,260,087 B1 | 7/2001 | Chang | |
| 8,397,143 B2 | 3/2013 | Neznanov et al. | |
| 8,656,250 B2 | 2/2014 | Gunnam et al. | |
| 2001/0028584 A1* | 10/2001 | Nakayama | G11C 29/24 365/203 |
| 2003/0023819 A1* | 1/2003 | Peel | G06F 5/08 711/201 |

FOREIGN PATENT DOCUMENTS

JP 2020046916 A * 3/2020 ............. G11C 29/52

* cited by examiner

*Primary Examiner* — Fernando Hidalgo
(74) *Attorney, Agent, or Firm* — Brooks, Cameron & Huebsch, PLLC

(57) ABSTRACT

A method includes receiving, by shift circuitry, a bit string comprising a plurality of bits and determining, based on a shifting indicator, a quantity of bits by which the bit string is to be shifted within the shift circuitry. The method further includes generating a shifted bit string by performing, by the shift circuitry, an operation to shift the bit string by the quantity of bits indicated by the shifting indicator and performing, by decision circuitry coupled to the shift circuitry, an operation to alter one or more of the plurality of bits of the shifted bit string from a logical value of one to a logical value of zero or from a logical value of zero to a logical value of one.

24 Claims, 5 Drawing Sheets

SYNDROME DECODING SYSTEM

PRIORITY INFORMATION

This application claims the benefit of U.S. Provisional Application No. 63/429,699, filed on Dec. 2, 2022, the contents of which are incorporated herein by reference.

TECHNICAL FIELD

Embodiments of the disclosure relate generally to digital logic circuits, and more specifically, relate to a syndrome decoding system.

BACKGROUND

A memory sub-system can include one or more memory devices that store data. The memory devices can be, for example, non-volatile memory devices and volatile memory devices. The memory sub-system can include one or more analog and/or digital circuits to facilitate operation of the memory sub-system. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
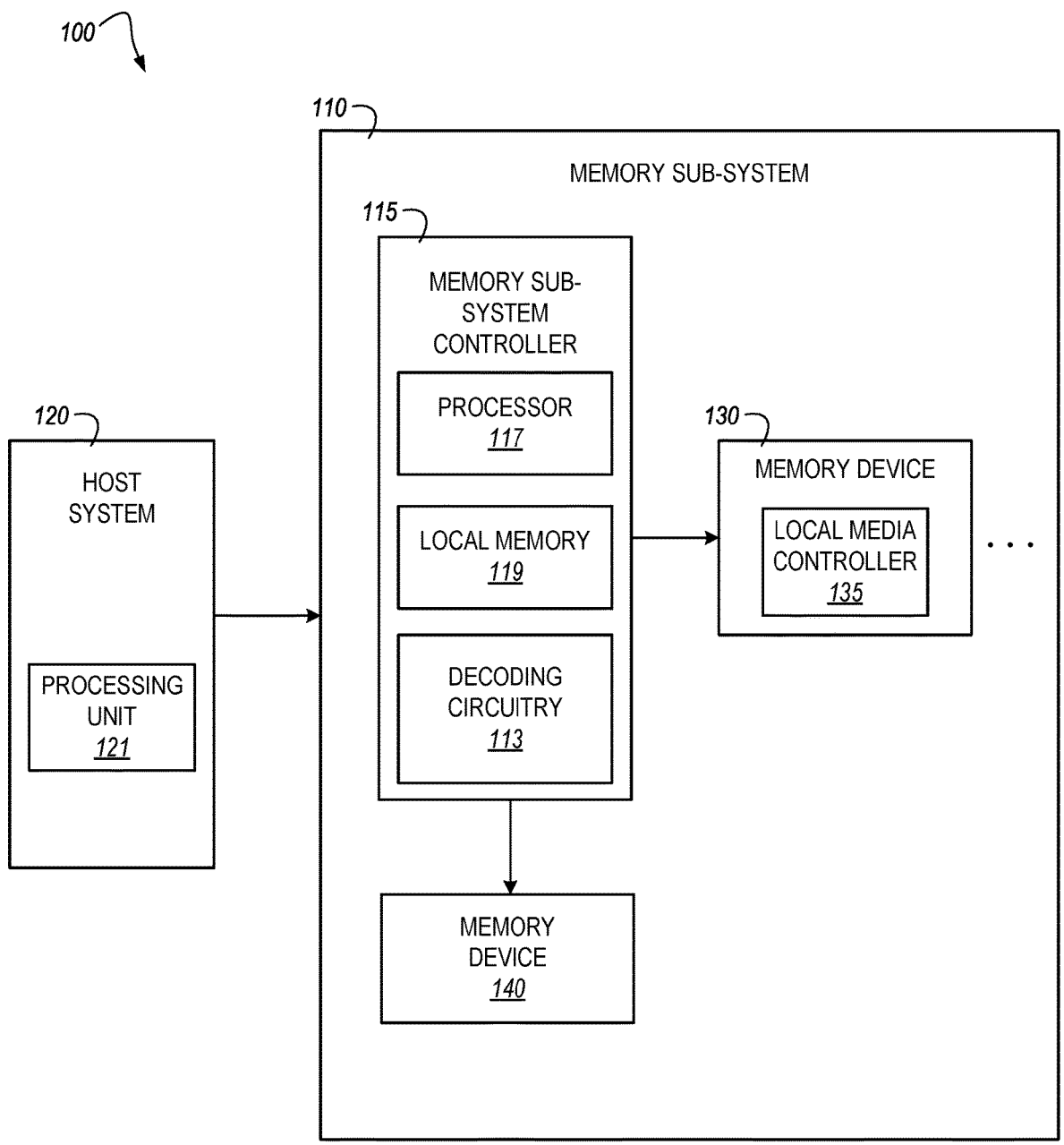
FIG. 1 illustrates an example computing system that includes a memory sub-system in accordance with some embodiments of the present disclosure.

Aspects of the present disclosure are directed to a syndrome decoding system and, in particular, to memory sub-systems that include a syndrome decoding system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

During operation of the memory sub-system, data is written to and stored by one or more memory devices. The data (e.g., one or more codewords that can correspond to, for example, user data) can be encoded prior to being transferred to the memory device(s) and/or prior to being written to (e.g., stored) by the memory device(s). Upon retrieval of the data, the data is generally decoded. There are many techniques for decoding of codewords, some non-limiting examples of which include maximum likelihood decoding, minimum distance decoding (e.g., decoding techniques that seek to minimize a Hamming distance associated with a codeword), list decoding, and/or information set decoding, among others.

As will be appreciated such decoding techniques can be employed in a memory sub-system to detect bit errors in data, e.g., codewords, based on determining that bits associated with the data have incorrect states (e.g., a "1" where a "0" should be and vice versa). Some of the more common decoding techniques employed in the context of memory sub-systems include Hamming codes, Reed-Solomon (RS) codes, Bose-Chaudhuri-Hochquenghem (BCH) codes, circular redundancy check (CRC) codes, Golay codes, Reed-Muller codes, Goppa codes, neighbor-cell assisted error correction codes, low-density parity-check (LDPC) error correction codes, quasi-cyclic LDPC (QC-LDPC) codes, Denniston codes, and syndrome decoding, among others. While each of these decoding techniques enjoy their own benefits, they also can experience various drawbacks. For example, more accurate decoding techniques tend to consume more power and/or time, while less accurate decoding techniques may be performed faster and may consume less power. In the interest of clarity, the present disclosure will be described in terms of linear codes, such as LDPC codes and/or syndrome decoding, which may be generally referred to herein as "decoding techniques," given the context of the disclosure; however, it will be appreciated that the techniques described herein apply to other decoding techniques as well.

In some approaches decoding of bit strings and/or syndromes is achieved by shifting the bit strings and/or syndromes using a first barrel shifter, performing operations using decision circuitry (which may be referred to in the alternative as "decoding circuitry") to flip bits (e.g., from a logical value of "0" to a logical value of "1," or vice versa), and shifting the bit strings and/or syndromes through a second barrel shifter prior to rewriting the bit strings and/or syndromes back to a memory array in which they were previously written. In general, the quantity of bits by which the bits strings and/or syndromes are cyclically shifted by the first barrel shifter is the same (but having an opposite sign) than the quantity of bits by which the bits strings and/or syndromes are cyclically shifted by the second barrel shifter. That is, if the bit strings and/or syndromes are cyclically shifted by seven bits (e.g., seven to the left) by the first barrel shifter, the bit strings and/or syndromes are cyclically shifted by negative seven bits (e.g., seven bits to the right) by the second barrel shifter. As the decoding techniques described herein are generally iterative in nature, the foregoing series of operations can be performed over multiple iterations until it is determined that the bit string and/or syndrome has been decoded.

In some approaches, the bit strings and/or syndromes that are processed (e.g., subjected to the operations described above as part of decoding the bit strings and/or syndromes) are determined by values in columns of a parity check matrix (e.g., an H matrix) and the quantity of bits by which the barrel shifters shift the bits of the bit strings and/or syndromes are generally determined based on values in rows of the parity check matrix. For example, which bit strings and/or syndromes to decode are selected (i.e., blocks of parity checks) based on corresponding values in the columns of the parity check matrix and an offset by which to cyclically shift the bit strings and/or syndromes by the first barrel shifter is selected based on corresponding values in the rows of the parity check matrix.

In such approaches, once the bits of the bit strings and/or syndromes are cyclically shifted by the first barrel shifter, the decision circuitry can arithmetically sum the values of the shifted bit strings and/or syndromes bit-wise and can make a determination as to which bits of the shifted bit strings and/or syndromes are to be "flipped" (e.g., from a logical value of "0" to a logical value of "1," or vice versa) based on a quantity of unsatisfied check operations involving the bits of the bit strings and/or syndromes. The decision circuitry can then perform operations to "flip" the bits that are determined to likely be erroneous.

In these approaches, for each bit flipped by the decision circuitry, the corresponding syndrome is generally flipped as well. In order to flip the bits of the corresponding syndromes, the bit string and/or syndrome is shifted through a second barrel shifter, which cyclically shifts the bit string and/or syndrome "backward" (that is, in the opposite direction by which the bits were shifted by the first barrel shifter, as described above) by the inverse of the offset that was used which to cyclically shift the bit strings and/or syndromes by the first barrel shifter (e.g., the offset that was selected based on corresponding values in the rows of the parity check matrix).

In order to address these and other deficiencies of current approaches, embodiments of the present disclosure allow for decoding operations (e.g., iterative bit string and/or syndrome decoding operations) to be performed using a single barrel shifter and decision circuitry in contrast to the approaches described above that rely on two barrel shifters to perform decoding operations.

As described in more detail herein, embodiments of the present disclosure transfer bit strings and/or syndromes (as determined by information contained in a column of a parity check matrix) from a memory array to a barrel shifter and perform a cyclical shift operation by a quantity of bits that is determined by performing an arithmetic operation between a first offset (e.g., an offset corresponding to a value stored in a current column in a first layer) and a second offset (e.g., an offset corresponding to a value stored in a previous column in the first layer) in a parity check matrix. Accordingly, in some embodiments, the syndromes are stored such that each bit corresponds to the code bit that was checked in the last column that is checked within each layer. Therefore, shifting by the difference between the offset of the current column and previous column would align the syndrome to the code bits of the current code block, as desired.

The shifted bit string and/or syndrome is then transferred to decision circuitry. The decision circuitry can ensure that the syndromes of each column layer are aligned such that their values correspond to the checked code bits in the current block column of the parity check matrix, although embodiments are not so limited. The decision circuitry performs operations to flip bits of the bit strings and/or syndromes in an attempt to decode the bit strings and/or syndromes, as described herein. After the decision circuitry performs the operations to flip such bits, the bit strings and/or syndromes are transferred directly back to the memory array and a subsequent iteration of the decoding operation can be performed using the stages described above, if desired (e.g., if there are still erroneous bits in the bit strings and/or syndromes).

By performing the operations described herein utilizing a single barrel shifter, both power and time may be saved in comparison to the approaches described above. For example, power savings are realized as a result of eliminating the power drawn from the second barrel shifter and time is saved as a result of eliminating cyclical shifting operations performed by the second barrel shifter. Further, the overall footprint of the decoding circuitry as a whole (e.g., the barrel shifter and the decision circuitry combined) is reduced as a result of eliminating the second barrel shifter of the approaches detailed above, which can be especially advantageous as form factors of various computing devices in which embodiments of the present disclosure may operate trend toward increasingly compact layouts with commensurately limited real estate for circuit component placement.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include decoding circuitry 113. Although not shown in FIG. 1 so as to not obfuscate the drawings, the decoding circuitry 113 can include various circuitry to facilitate aspects of the disclosure described herein. In some embodiments, the decoding circuitry 113 can include special purpose circuitry in the form of an ASIC, FPGA, state machine, hardware processing device, and/or other logic circuitry that can allow the decoding circuitry 113 to orchestrate and/or perform operations to provide bit string and/or syndrome decoding, particularly with respect to a system-on-chip, in accordance with the disclosure. The decoding circuitry 113 is discussed in more detail in connection FIG. 2 and FIG. 3, herein.

In some embodiments, the memory sub-system controller 115 includes at least a portion of the decoding circuitry 113. For example, the memory sub-system controller 115 can include a processor 117 (processing device) configured to execute instructions stored in local memory 119 for performing the operations described herein. In some embodiments, the decoding circuitry 113 is part of the host system 110, an application, or an operating system. The decoding circuitry 113 can be resident on the memory sub-system 110 and/or the memory sub-system controller 115. As used herein, the term "resident on" refers to something that is physically located on a particular component. For example, the decoding circuitry 113 being "resident on" the memory sub-system 110, for example, refers to a condition in which the hardware circuitry that comprises the decoding circuitry 113 is physically located on the memory sub-system 110. The term "resident on" may be used interchangeably with other terms such as "deployed on" or "located on," herein.

Figure 2:
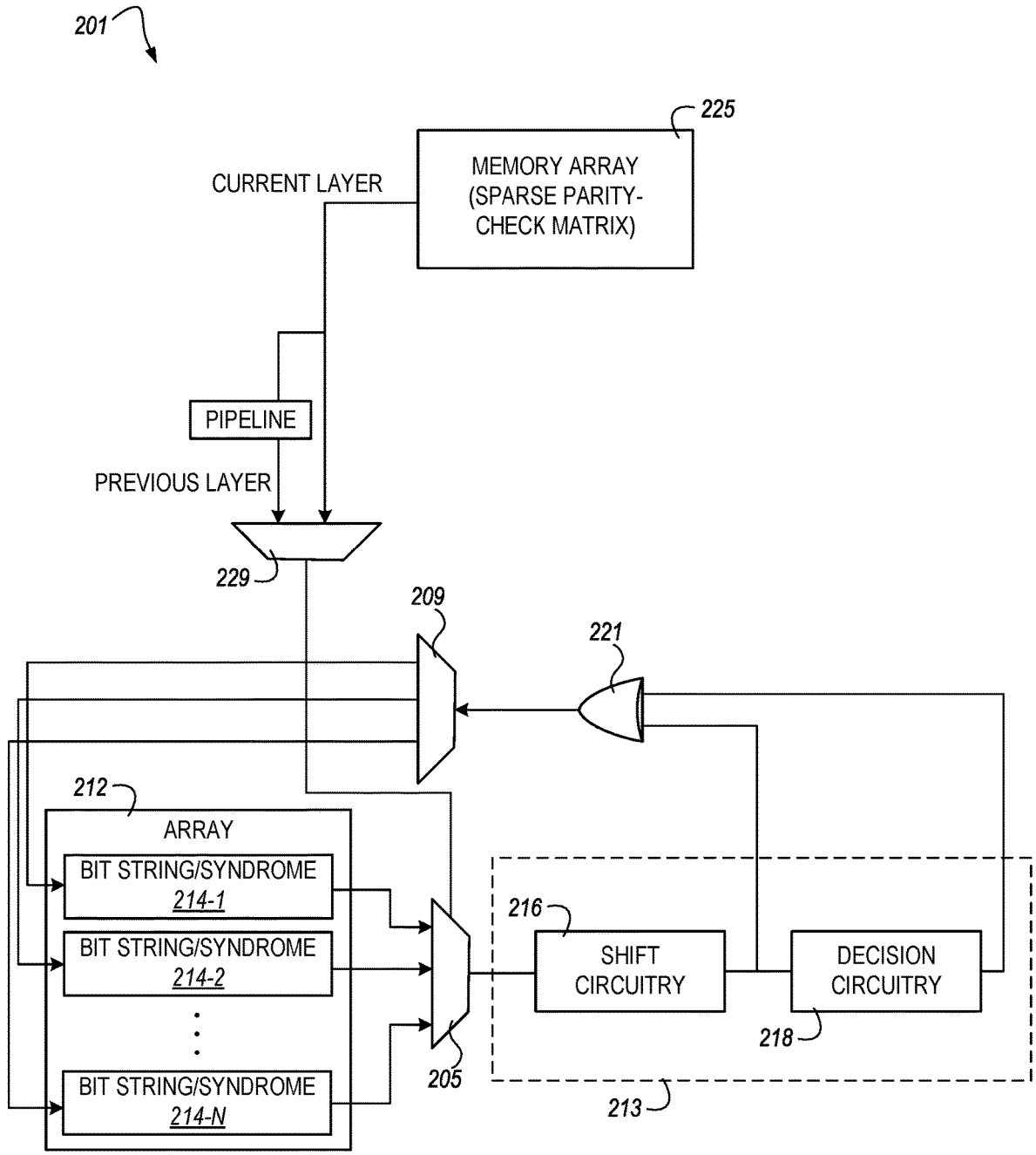
FIG. 2 illustrates an example of a syndrome decoding system in accordance with some embodiments of the present disclosure.

FIG. 2 illustrates an example of a syndrome decoding system 201 in accordance with some embodiments of the present disclosure. The syndrome decoding system 201 includes at least a portion of the decoding circuitry 113 illustrated in FIG. 1. The example system 201, which can be referred to in the alternative as an "apparatus," includes an array 212 (e.g., a "first" array) that can include devices, such as memory cells, configured to store bit strings and/or syndromes 214-1, 214-2, to 214-N, (which can be referred to collectively as bit strings and/or syndromes 214). In some embodiments, the bit strings and/or syndromes 214 comprise codewords that are utilized by the memory sub-system 110. As used herein, the term "codeword" generally refers to a data word having a specified size (e.g., 4 KB, etc.) that is encoded such that the codeword can be individually protected by some error encoding and/or decoding scheme. For example, a "codeword" can refer to a set of bits (e.g., a bit string and/or a syndrome) that can be individually encoded and/or decoded. In general, for NAND type memory devices, a "codeword" can represent the smallest unit (e.g., set of bits) that can be read by a memory device, host device, or other computing device associated with the system 201.

Although not explicitly shown in FIG. 2, one or more of the components illustrated can be one of a plurality of such components. For example, the decision circuitry 218 can be a single decision circuit 218 of any quantity of decision circuits 218 (e.g., there can be eight, ten, twelve, etc. decisions circuits 218, eight, ten, twelve, etc. shift circuits 216, etc. although embodiments are not limited to these particular quantities). However, in at least one embodiment, the shift circuitry 216 is the only shift circuitry 216 of the system 201 (i.e., there is no second shift circuitry coupled to the decision circuitry 218 to receive results of operations performed by the decision circuitry 218).

The array 212 can be an array of memory cells and/or an array of flip-flops and/or latches, etc. As shown in FIG. 2, the array 212 is coupled to a multiplexer (or "MUX") 205 that is configured to selectively transfer one or more of the bit strings and/or syndromes 214 to shift circuitry 216. In some embodiments, the shift circuitry 216 can comprise a barrel shifter that is configured to shift the bit strings and/or syndromes 214 by a specified number of bits. That is, in some embodiments, the shift circuitry 216 can shift the bit strings and/or syndromes 214 by a specified number of bits using pure combinatorial logic. Embodiments are not so limited, however, and it is contemplated within the disclosure that the shift circuitry 216 can be configured to perform shift operations involving the bit strings and/or syndromes 214 utilizing other combinatorial logic techniques (e.g., cyclical shifting or circular shifting, etc.) and/or sequential logic techniques.

In embodiments in which the shift circuitry 216 is a barrel shifter that is configured to perform cyclical shifting operations, the quantity of bits that are shifted by the barrel shifter can be determined based on information written to the memory array 225. That is, in some embodiments, data stored within a sparse parity-check matrix within the memory array 225 can be utilized to determine a quantity of bits by which the shift circuitry 216 shifts a received bit string and/or syndrome 214, as described in more detail in connection with FIG. 3, herein.

The shift circuitry 216 is coupled to decision circuitry 218. The decision circuitry 218 includes hardware circuitry that is configured to correct erroneous bits (e.g., bit-flip errors) in the bit strings and/or syndromes 214. In some embodiments, the decision circuitry 218 can cause one or more bits in the bit strings and/or syndromes 214 to be flipped based on a determined probability that such bits are erroneous. The probability that one or more bits in the bit strings and/or syndromes 214 is to be flipped can be determined using various linear codes, such as syndrome decoding codes, LDPC codes, etc. Embodiments are not limited to cases in which the decision circuitry 218 causes one or bits in the bit strings and/or syndromes 214 to be flipped based on a determined probability that such bits are erroneous (e.g., through the use of a linear decoding technique), however, and in some embodiments, the decision circuitry 218 can determine which bits of the bit strings and/or syndromes 214 are erroneous based on mathematical inference algorithms, machine learning algorithms, and/or other suitable techniques for determining which bits of the bit strings and/or syndromes 214 are erroneous.

In a simplified example that is provided for illustrative purposes, take a syndrome 214 that contains the following bit pattern: [1 0 0 1 0 1 1 0], the decision circuitry 218 may determine that the second bit (from the right) is likely to be erroneous and can therefore process the syndrome 214 to flip the second bit thereby yielding the following new syndrome [1 0 0 1 0 1 0 0]. Such a bit flip gets the decoder closer to a codeword (in which all the syndrome bits are zero). Embodiments are not limited to scenarios in which the decision circuitry 218 causes only a single bit to be flipped as part of decoding the syndromes 214, however. For example, using the same initial syndrome given above [1 0 0 1 0 1 1 0], the decision circuitry 218 may determine that the second bit, the third bit, and the eighth bit are likely to be erroneous and can therefore process the syndrome 214 to flip the second bit, the third bit, and the eighth bit thereby yielding the following new syndrome [0 0 0 1 0 0 0 0]. It is noted that these illustrative non-limiting examples can be part of an iterative decoding process in which the syndrome 214 are processed by the decision circuitry 218 multiple times in an effort to decode such syndromes 214. Accordingly, the illustrative non-limiting example given above can represent operations performed by the decision circuitry 218 at a first iteration of the decoding process, or at any subsequent iteration of the decoding process.

Once the decision circuitry 218 has attempted to correct one or more erroneous bits in the bit strings and/or syndromes 214, the bit strings and/or syndromes 214 can be transferred to an input of a logical gate 221. In some embodiments, when one or more bits of a bit string are corrected, a corresponding syndrome (which can reflect an error state corresponding to a bit string) can be updated to reflect a current error state of the syndrome. Although in some embodiments, it is the syndrome that is processed (e.g., by the multiplexer 205, the shift circuitry 216, the decision circuitry 218, the logic gate 221, etc.), the following non-limiting examples make reference to both bit strings and/or syndromes in order to illustrate various aspects of the present disclosure. As shown in FIG. 2, the logic gate 221 is a XOR gate, although embodiments are not limited to the utilization of a XOR gate. In embodiments in which the logic gate 221 comprises a XOR gate, the bit strings and/or syndromes 214 processed by the decision circuitry 218 are received as inputs by the logic gate 221 and a logical XOR operation is performed thereon. As will be appreciated, if the result of the logical XOR operation returns a value of zero, the bit string and/or syndrome 214 has successfully been decoded. In response to determining that the bit string and/or syndrome 214 has been successfully decoded, an indication that the bit string and/or syndrome 214 that has been successfully decoded can be recorded and the de-multiplexer 209 is set such that further processing (e.g., retrieving from the array 212, shifting through the shift circuitry 216, processing by the decision circuitry 218, etc.) of that particular the bit string and/or syndrome 214 is avoided. It will be appreciated that, in general, it is the bit string that has been decoded because, as mentioned above, the syndrome generally reflects a current error state associated with data contained within the bit string and, once the value of the syndrome has reached zero, it implies that the bit string has been decoded; however, in keeping with the conventions outlined in the present disclosure, reference to both bit strings and/or syndromes is utilized in order to illustrate various aspects of the present disclosure.

Bit strings and/or syndromes 214 that are not successfully decoded (e.g., bit strings and/or syndromes that include a quantity of bits that do not return a zero value after being passed through the logic gate 221), can be written back to the array 212 for subsequent processing (e.g., subsequent iterations of the decoding operation). It is noted that, in contrast to previous approaches in which all of the bit strings and/or syndromes 214 participate in the subsequent iteration of the decoding operation, embodiments herein provide that at least some of the bit strings and/or syndromes 214 do not participate in every subsequent iteration of the decoding process, thereby reducing the power consumed by the system 201 in performing the decoding operation. For example, at least because embodiments herein do not fire every row of the array 212 (as some of the bit strings and/or syndromes 214 that have been successfully decoded are not further processed), the amount of power consumed is decreased (1) due to firing fewer rows of the array 212 as the quantity of iterations of the decoding operation increases, (2) refraining from operating the shift circuitry 216 corresponding to bit strings and/or syndromes 214 that have been successfully decoded as the quantity of iterations of the decoding operation increases, and (3) refraining from operating the decision circuitry 218 for bit strings and/or syndromes 214 that have been successfully decoded as the quantity of iterations of the decoding operation increases.

As iterations of the decoding operation are performed, an increasing quantity of bit strings and/or syndromes 214 that have been successfully decoded will be detected. Once the bit strings and/or syndromes 214 have all been successfully decoded, it can be determined that the decoding operation has been successfully performed on all of the bit strings and/or syndromes 214. If, however, it appears that values of the bit strings and/or syndromes 214 may not converge to zero (e.g., there are too many uncorrectable errors in at least a threshold quantity of bit strings and/or syndromes 214), it can be determined that the decoding operation may not successfully conclude. That is, if it is determined that greater than a threshold error quantity value for the bit strings and/or syndromes 214, the decoding operation may not successfully complete, and the decoding operation can be aborted.

In contrast to approaches in which a large adder circuit sums values associated with the bits in all the bit strings and/or syndromes 214 subsequent to one or more iterations of a decoding operation in order to determine if the decoding operation should be aborted, embodiments herein allow for the decoding operation to be aborted simply by determining whether a quantity of uncorrectable bits in the bit string and/or syndromes meets or exceeds a threshold value and, in response to such a determination, aborting the decoding operation. This feature can allow for simplified abortion of decoding operations that are determined to be unlikely to converge (e.g., to result in successful decoding of the bit strings and/or syndromes 214) as compared to previous approaches, thereby minimizing an amount of power consumed in performing iterations of a decoding operation that is likely to fail.

In a non-limiting example, an apparatus (e.g., the computing system 100 illustrated in FIG. 1, the decoding circuitry 113 illustrated in FIG. 1, the syndrome decoding system 201 illustrated in FIG. 2, and/or components thereof), includes shift circuitry 216 configured to receive a syndrome 214 comprising a plurality of bits having a logical value of one or a logical value of zero and receive, from a first memory array 225 coupled to the shift circuitry 216, a shifting indicator corresponding to a quantity of bits by which to shift the syndrome 214 within the shift circuitry 216. As described herein, the shift circuitry 216 can comprise a barrel shifter. In some embodiments, the shifting indicator can be generated as described in connection with FIG. 3, herein. The shift circuitry 216 can generate a shifted syndrome by performing an operation to shift the plurality of bits of the syndrome by the quantity of bits indicated by the shifting indicator.

Continuing with this non-limiting example, decision circuitry 218 is coupled to the shift circuitry 216. The decision circuitry 218 is configured to receive the shifted syndrome, perform an operation to alter one or more of the plurality of bits of the shifted syndrome from the logical value of one to the logical value of zero or from the logical value of zero to the logical value of one, and transfer a result of the operation to alter the one or more of the plurality of bits of the shifted syndrome to a second memory array 212 coupled to the decision circuitry 218 and the shift circuitry 216. The second memory array 212 can be configured to, prior to receiving the result of the operation to alter the one or more of the plurality of bits of the syndrome, store the syndrome 214 received by the shift circuitry 218. In some embodiments, the decision circuitry 218 is configured to transfer the result of the operation to alter the one or more of the plurality of bits of the shifted syndrome to the second memory array 212 while refraining from transferring the result of the operation to alter the one or more of the plurality of bits of the shifted syndrome to second shift circuitry.

That is, in contrast to previous approaches that employ shift circuitry 216 to shift bit strings and/or syndromes 214 prior to processing by the decision circuitry 218 and second shift circuitry to shift bit strings and/or syndromes 214 subsequent to processing by the decision circuitry 218, embodiments herein allow for decoding operations to be performed using a single shift circuitry 216. Stated alternatively, in some embodiments, the apparatus is devoid of shift circuitry other than the shift circuitry 216. These and other aspects of the disclosure allow for a reduction in an amount of power consumed in performance of decoding operations, a reduction in an amount of time consumed in performance of decoding operations, and a reduction in an amount of physical space traditionally reserved for circuit components in the system 201. Accordingly, in some embodiments, the decision circuitry 218 can be configured to transfer the result of the operation to alter the one or more of the plurality of bits of the shifted syndrome to the second memory array 212 in order to reduce an amount of power consumed in operation of a computing system in which the syndrome 214 is processed or to increase a speed at which a decoding operation is performed within the computing system, or both.

As described in more detail in connection with FIG. 3, the first memory array 225 can be configured to store a sparse parity-check matrix (or H-matrix). The H-matrix can be a progressive edge-growth graph, such as a Tanner graph, that can be used in connection with LDPC codes. In some embodiments, the first memory array 225 can be configured to store, in a row (e.g., the rows 340 illustrated in FIG. 3) of the first memory array 225, information corresponding to selection of the syndrome 214 for receipt by the shift circuitry 216 and store, in a column (e.g., the columns 342 illustrated in FIG. 3) of the first memory array 225, information corresponding to the shifting indicator corresponding to the syndrome 214. Further, the shifting indicator can be determined by performing an arithmetic operation involving numerical values written to at least one row and/or at least one column of the first memory array 225.

In another non-limiting example, a system (e.g., the system 201) includes a first array of memory cells 212 configured to store a plurality of syndromes 214 that each comprise a plurality of bits of data and a second array of memory cells 225. In this non-limiting example, the second array of memory cells 225 is configured to store, in each respective row (e.g., the rows 340 illustrated in FIG. 3) of the second array 225, information corresponding to a respective syndrome among the plurality of syndromes 214 and store, in each respective column (e.g., the columns 342 illustrated in FIG. 3) of the second array 225, information corresponding to a respective shifting indicator corresponding to each respective syndrome among the plurality of syndromes 214. Accordingly, in some embodiments, the second array 225 can be configured to store a sparse parity-check matrix, as described in more detail in connection with FIG. 3.

The system 201 can further include first circuitry (e.g., the shift circuitry 216) coupled to the first array 212 and the second array 225 that can be configured to perform an operation to shift the plurality of bits of one or more of the plurality of syndromes 214 based on the respective shifting indicator that corresponds to the one or more of the plurality of syndromes 214. As discussed in more detail in connection with FIG. 3, each respective shifting indicator can be determined by performing an arithmetic operation involving numerical values written to each respective row and/or each respective column of the second array 225.

The system can further include second circuitry (e.g., the decision circuitry 218) coupled to the first array 212 that can be configured to perform an operation to alter one or more of the plurality of bits of the syndromes 214 from a logical value of one to a logical value of zero or from a logical value of zero to a logical value of one and transfer a result of the operation to alter the one or more of the plurality of bits of the syndromes to the first array 212 while refraining from transferring the result of the operation to alter the one or more of the plurality of bits of the syndromes 214 to intervening circuitry. For example, the second circuitry can be configured to flip bits of the plurality of syndromes 214 as part of performance of a decoding operation to correct erroneous bits contained in the plurality of syndromes 214. That is, in some embodiments, the second circuitry is configured to determine a quantity of errors contained within each of the syndromes 214 based on a quantity of bits having the logical value of one within each of the plurality of syndromes 214.

As described herein, the second circuitry is configured to refrain from transferring the result of the operation to alter the one or more of the plurality of bits of the syndromes 214 to the intervening circuitry in order to reduce an amount of power consumed in operation of a computing system in which the bit string is processed or to increase a speed at which a decoding operation is performed within the computing system, or both. That is, by not including intervening circuitry (such as a second shift circuitry that is employed in previous approaches described herein), the result of the operation to alter the one or more of the plurality of bits of the syndromes 214 can be transferred directly from the second circuitry to the first array 212 thereby reducing the amount of power, time, bandwidth, and//or physical area required by the system 201 in comparison to the previous approaches described herein.

Continuing with this non-limiting example, the first array 212, the second array 225, the first circuitry 216, and the second circuitry 218 are resident on a System on Chip (SoC). In embodiments, the first circuitry comprises a barrel shifter and the second circuitry comprises decision circuitry. As described herein, in embodiments in which the first circuitry comprises a barrel shifter, the barrel shifter is an only barrel shifter resident on the SoC.

Figure 3:
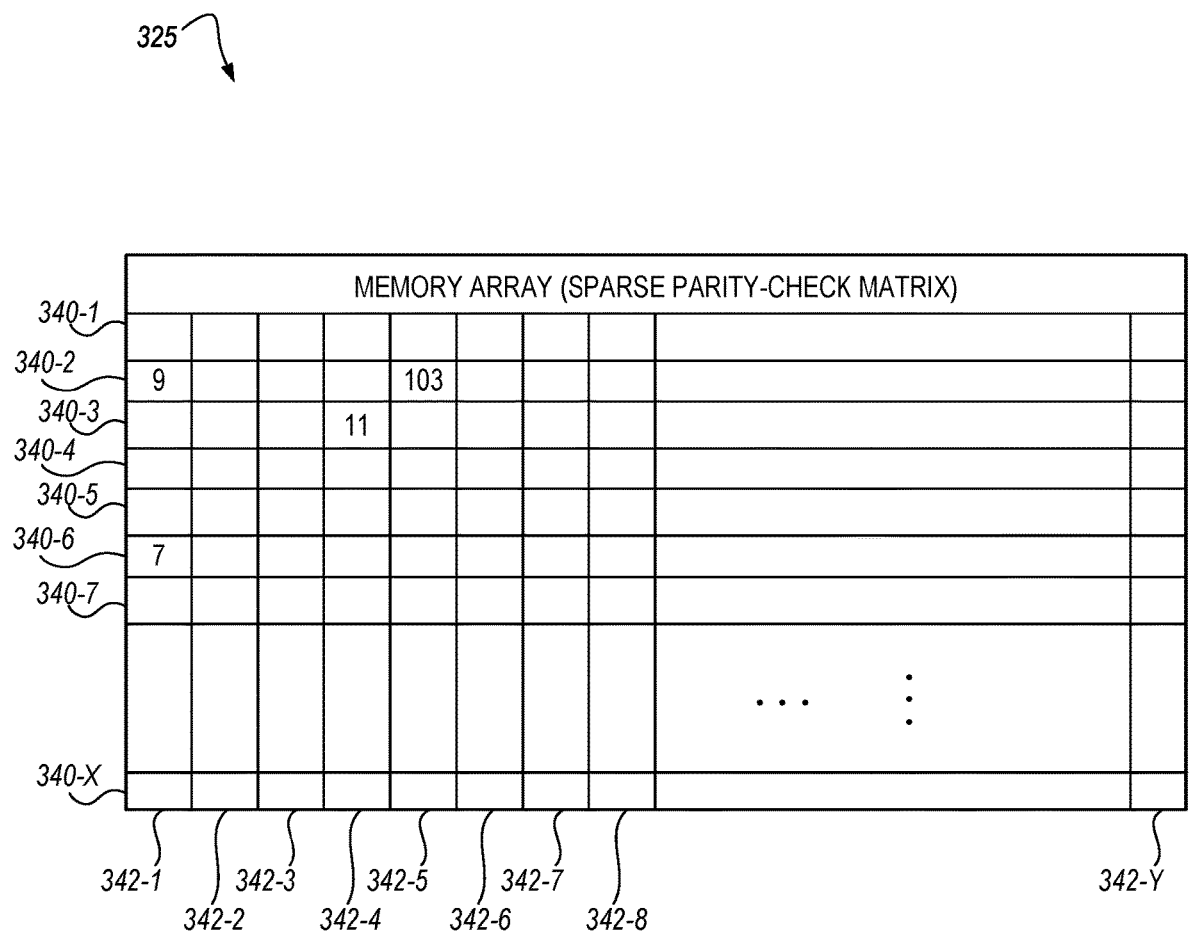
FIG. 3 illustrates an example of a memory array that stores a sparse parity-check matrix in accordance with some embodiments of the present disclosure.

FIG. 3 illustrates an example of a memory array 325 that stores a sparse parity-check matrix in accordance with some embodiments of the present disclosure. The memory array 325 can be analogous to the memory array 225 illustrated in FIG. 2, herein. The sparse parity-check matrix can be referred to as an "H-matrix" in accordance with parlance common in the art and can be used to specify an error correction code, such as a low-density parity-check code.

The values of the sparse parity-check matrix in the memory array 325 can be organized into rows 340-1, 340-2, 340-3, 340-4, 340-5, 340-6, 340-7 to 340-X (which can be generally referred to herein as rows 340) and columns 342-1, 342-2, 342-3, 342-4, 342-5, 342-6, 342-7, 342-8 to 342-Y (which can be generally referred to herein as columns 342). Each of the rows 340 can correspond to a respective bit string and/or syndrome (e.g., one of the respective bit strings and/or syndromes 214 illustrated in FIG. 2, herein) and each of the columns can store data values that are indicative of a quantity of bits by which the corresponding bit string and/or syndrome is to be shifted by, for example, the shift circuitry 216 illustrated in FIG. 2.

As a non-limiting example, the row 340-1 can correspond to the bit string and/or syndrome 214-1, the row 340-2 can correspond to the bit string and/or syndrome 214-2, and so on and so forth, with the row 340-X corresponding to the bit string and/or syndrome 214-N. In addition to, or in the alternative, each of the rows 340 of the sparse parity-check matrix stored in the memory array 325 can correspond to a layer of bit strings and/or syndromes utilized in performance of the decoding operations described herein. Embodiments are not so limited, however, and the rows 340 can correspond to the bit strings and/or syndromes described herein in different orders and/or with different correspondences.

In some embodiments, the block rows 340 in the memory array sparse-parity check matrix 325 can correspond to one or more layers and one or more syndromes utilized in performance of the decoding operations described herein. In a non-limiting example, each layer consists of one hundred twenty-eight (128) rows 340, although embodiments are not limited to this particular enumerated quantity of rows. The quantity of rows 340 (one hundred twenty-eight rows in this non-limiting example) corresponding to each layer can be referred to as the circulant size for the memory array sparse-parity check matrix 325.

Continuing with this example, each of the rows 340 can have an associated syndrome bit and each layer can correspond to a syndrome block, which, as mentioned above can include a quantity of bits that is equal to the circulant size (one hundred twenty-eight rows in this non-limiting example). During each clock cycle associated with performing the decoding operations described herein, operations are performed using a particular block column 342, which also may include a quantity of bits that is equal to the circulant size.

The shifting indicator (e.g., the offset) described herein can be calculated by performing an arithmetic operation using a first offset value (e.g., an offset value in a block column corresponding to a current syndrome layer) and a second offset value (e.g., an offset value in a block column corresponding to a previous syndrome layer). For example, the shifting indicator (e.g., the offset) can be calculated as the difference between the first offset value and the second offset value modulo the circulant size in some embodiments. Accordingly, in a non-limiting example in which the circulant size is one hundred twenty-eight (128), the first offset value is eighty-eight (88) and the second offset value is one hundred and three (103), the shifting indicator is given by: (88-133) mod 128=88-103+128=113.

In general, each layer corresponds to the circulant size so, in the case where the circulant size is one hundred twenty-eight (128), a first layer includes the first one hundred twenty-eight (128) rows of the memory array 325. A second layer can include the next one hundred twenty-eight (128) rows of the memory array 325 (e.g., rows one hundred twenty-nine (129) to two hundred fifty-six (256), and so on and so forth. As mentioned above, embodiments are not limited to this particular circulant size and other circulant sizes and, hence, quantities of rows associated with layers, are contemplated within the scope of the disclosure.

Bit strings and/or syndromes can be selected for processing (e.g., for performance in decoding operations described herein) according to values (or lack thereof) in the respective rows 340 of the sparse parity-check matrix stored in the memory array 325. For example, the bit string and/or syndrome 214-1 can be selected for performance in a decoding operation described herein based on the presence of values in the row 340-1, the bit string and/or syndrome 214-2 can be selected for performance in a decoding operation described herein based on the presence of values in the row 340-2, etc. Similarly, if there are no values present in a row 340 of the sparse parity-check matrix, a corresponding bit string and/or syndrome may not be selected for performance in the decoding operations described herein.

In the illustrative example illustrated in FIG. 3, the row 340-1 that may correspond to the bit string and/or syndrome 214-1 does not contain any values. Accordingly, the bit string and/or syndrome 214-1 is not selected for performance of a decoding operation as described herein. In contrast, the illustrative sparse parity-check matrix stored in the memory array 325 includes values (the value "9" in column 342-1 and the value "103" in the column 342-5) in row 340-2. Accordingly, the bit string and/or syndrome 214-2 may be selected for performance of a decoding operation as described herein. Similarly, a bit string and/or syndrome associated with row 340-3 may be selected for performance of a decoding operation as described herein, while bit strings and/or syndromes associated with rows 340-4 and 340-5 may not be selected for performance of a decoding operation as described herein.

As mentioned above, the values in the columns 342 of the sparse parity-check matrix stored in the memory array 325 can be used to determine a shifting indicator (e.g., how many bits the shift circuitry 216 will shift the corresponding bit string and/or syndrome), particularly when the shift circuitry 216 comprises a barrel shifter. In order to determine how many bits the shift circuitry 216 will shift the corresponding bit string and/or syndrome, an arithmetic operation is performed using the values in the columns 342 of the sparse parity-check matrix stored in the memory array 325.

In an additional illustrative example, when the bit string and/or syndrome corresponding to the row 340-2 is selected for performance of a decoding operation, an arithmetic operation is performed using the value "9" stored in the column 342-1 and the value "103" stored in the column 342-5. In this particular example, because the value "9" (e.g., the value in the leftmost column 342 of the row 340-2) is less than the value "103" (e.g., the value in the rightmost column 342 of the row 340-2), the quantity of bits by which to shift the bit string and/or syndrome corresponding to the row 340-2 is calculated as follows: 128−9−103=34, which means that the shifting indicator (e.g., the offset) is thirty-four (34) and that bit string and/or syndrome corresponding to the row 340-2 will be shifted by thirty-four (34) bits by the shift circuitry 216. The value "128" in this example corresponds to a quantity of bits associated with the bit string and/or syndrome and therefore corresponds to a quantity of storage locations (e.g., flip-flops) associated with the shift circuitry 216. If, however, a value in a leftmost column 342 of a particular row 340 is greater than the value in the rightmost column 342 of the particular row 340, a simple subtraction operation is performed to determine the quantity of bits by which to shift the bit string and/or syndrome.

Figure 4:
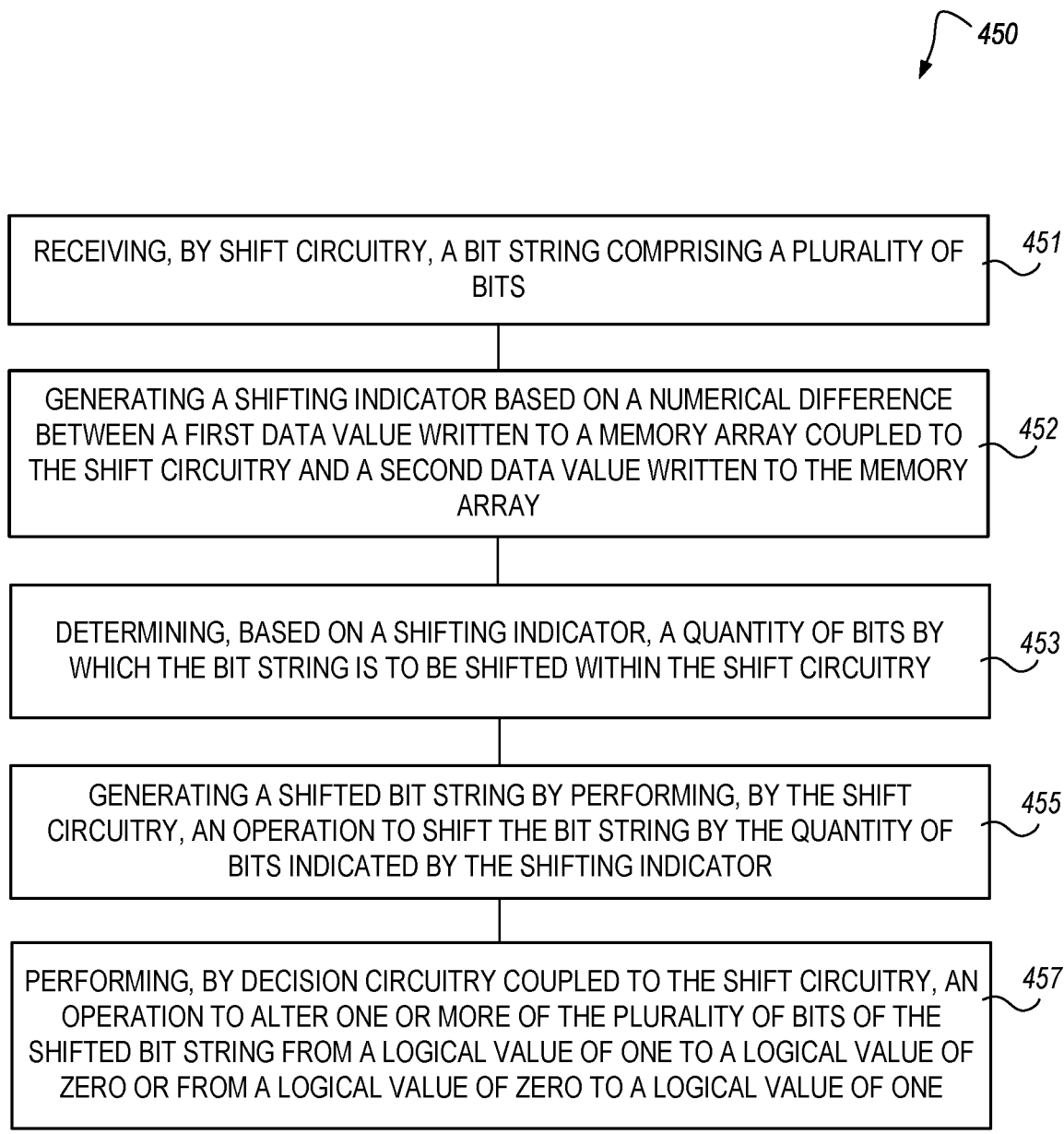
FIG. 4 is a flow diagram corresponding to a method for a syndrome decoding system in accordance with some embodiments of the present disclosure.

FIG. 4 is a flow diagram corresponding to a method 450 for a syndrome decoding system in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the decoding circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 451, the method 450 includes receiving, by shift circuitry, a bit string comprising a plurality of bits. In some embodiments, the bit string can comprise a syndrome and can be analogous to the bit strings and/or syndromes 214 described in connection with FIG. 2. The shift circuitry can be analogous to the shift circuitry 216 illustrated in FIG. 2 and can comprise a barrel shifter (e.g., an only barrel shifter resident on the systems described herein).

At operation 452, the method 450 includes generating a shifting indicator based on a numerical difference between a first data value written to a memory array coupled to the shift circuitry and a second data value written to the memory array. In some embodiments, the first data value and the second data value each correspond to a layer associated with the bit string and one of the first data value or the second data value corresponds to a current offset value associated with the layer and the other of the first data value or the second data value corresponds to a previous offset value associated with the layer, as described in connection with FIG. 3, above.

At operation 453, the method 450 includes determining, based on a shifting indicator, a quantity of bits by which the bit string is to be shifted within the shift circuitry. The shifting indicator can be generated as described in connection with FIG. 3, herein. Accordingly, the method 450 can include determining the shifting indicator based on values written to a memory array (e.g., the memory array 225 and/or the memory array 325 illustrated in FIG. 2 and FIG. 3, herein); wherein a column and/or a row of the memory array contains information corresponding to the bit string and a column and/or a row of the memory array contains information corresponding to the shifting indicator. In some embodiments, as described herein, the memory array is configured to store a sparse parity-check matrix and the quantity of bits by which the bit string is to be shifted is determined by performing an arithmetic operation involving numerical values written to the row of the memory array that contains the information corresponding to the shifting indicator.

At operation 455, the method 450 includes generating a shifted bit string by performing, by the shift circuitry, an operation to shift the bit string by the quantity of bits indicated by the shifting indicator. At operation 457, the method 450 includes performing, by decision circuitry (e.g., the decision circuitry 218 illustrated in FIG. 2, herein) coupled to the shift circuitry, an operation to alter one or more of the plurality of bits of the shifted bit string from a logical value of one to a logical value of zero or from a logical value of zero to a logical value of one.

The method 450 can further include transferring a result of the operation to alter the one or more of the plurality of bits to a memory array (e.g., the memory array 212 illustrated in FIG. 2, herein) while refraining from transferring the result of the operation to alter the one or more of the plurality of bits to second shift circuitry. That is, the method 450 can be performed in the absence of shift circuitry additional to the shift circuitry that generates the shifted bit string described above. For example, as described herein, the method 450 can include refraining from transferring the result of the operation to alter the one or more of the plurality of bits to second shift circuitry in order to reduce an amount of power consumed in operation of a computing system in which the bit string is processed or to increase a speed at which a decoding operation is performed within the computing system, or both. In some embodiments, prior to performing the operation to shift the bit string by the quantity of bits indicated by the shifting indicator, the bit string was stored in the memory array (e.g., the memory array 212 of FIG. 2).

Figure 5:
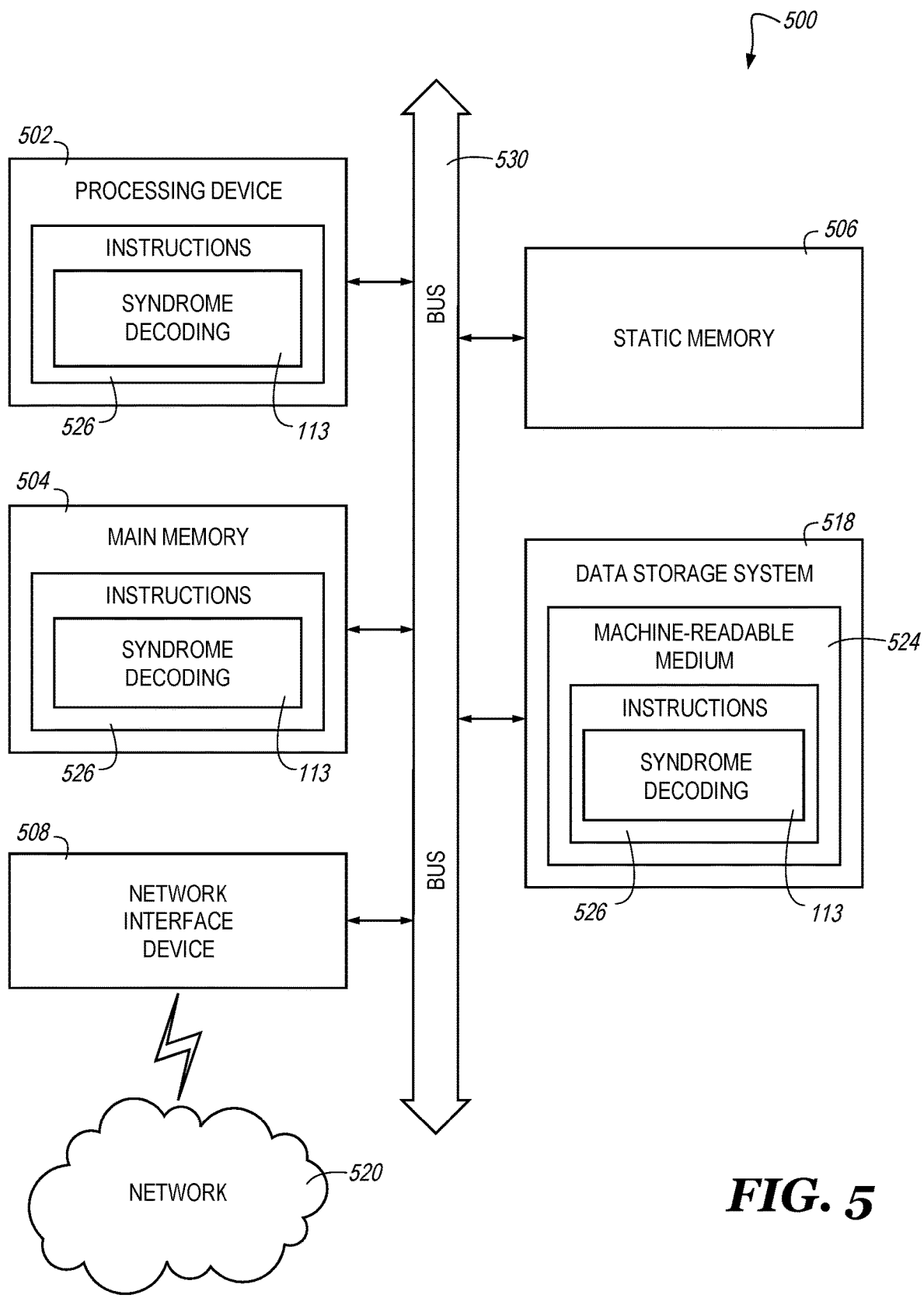
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the decoding circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to syndrome decoding circuitry (e.g., the decoding circuitry 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving, by shift circuitry, a bit string comprising a plurality of bits;
generating a shifting indicator based on a numerical difference between a first data value written to a memory array coupled to the shift circuitry and a second data value written to the memory array, wherein:
the first data value and the second data value each correspond to a layer associated with the bit string, and
one of the first data value or the second data value corresponds to a current offset value associated with the layer and the other of the first data value or the second data value corresponds to a previous offset value associated with the layer;
determining, based on the shifting indicator, a quantity of bits by which the bit string is to be shifted within the shift circuitry;
generating a shifted bit string by performing, using the shift circuitry, an operation to shift the bit string by the quantity of bits indicated by the shifting indicator; and
performing, by decision circuitry coupled to the shift circuitry, an operation to alter one or more of the plurality of bits of the shifted bit string from a logical value of one to a logical value of zero or from a logical value of zero to a logical value of one.

2. The method of claim 1, wherein the bit string comprises a syndrome.

3. The method of claim 1, further comprising transferring a result of the operation to alter the one or more of the plurality of bits to a memory array while refraining from transferring the result of the operation to alter the one or more of the plurality of bits to second shift circuitry.

4. The method of claim 3, wherein, prior to performing the operation to shift the bit string by the quantity of bits indicated by the shifting indicator, the bit string was stored in the memory array.

5. The method of claim 3, further comprising refraining from transferring the result of the operation to alter the one or more of the plurality of bits to second shift circuitry in order to reduce an amount of power consumed in operation of a computing system in which the bit string is processed or to increase a speed at which a decoding operation is performed within the computing system, or both.

6. The method of claim 1, wherein a column of the memory array contains information corresponding to the bit string and a row of the memory array contains information corresponding to the shifting indicator.

7. The method of claim 1, wherein the memory array is configured to store a sparse parity-check matrix.

8. The method of claim 1, wherein the quantity of bits by which the bit string is to be shifted is determined by performing an arithmetic operation involving numerical values written to the row of the memory array that contains the information corresponding to the shifting indicator.

9. An apparatus, comprising:
shift circuitry configured to:
receive a syndrome comprising a plurality of bits having a logical value of one or a logical value of zero;
receive, from a first memory array coupled to the shift circuitry, a shifting indicator corresponding to a quantity of bits by which to shift the syndrome within the shift circuitry, wherein the shifting indicator is generated by:
calculating a numerical difference between a first data value written to the memory array coupled to the shift circuitry and a second data value written to the first memory array, wherein:
the first data value and the second data value each correspond to a layer associated with the bit string, and
one of the first data value or the second data value corresponds to a current offset value associated with the layer and the other of the first data value or the second data value corresponds to a previous offset value associated with the layer; and
generate a shifted syndrome by performing an operation to shift the plurality of bits of the syndrome by the quantity of bits indicated by the shifting indicator; and
decision circuitry coupled to the shift circuitry and configured to:
receive the shifted syndrome;
perform an operation to alter one or more of the plurality of bits of the shifted syndrome from the logical value of one to the logical value of zero or from the logical value of zero to the logical value of one; and
transfer a result of the operation to alter the one or more of the plurality of bits of the shifted syndrome to a second memory array coupled to the decision circuitry and the shift circuitry.

10. The apparatus of claim 9, wherein the decision circuitry is configured to transfer the result of the operation to alter the one or more of the plurality of bits of the shifted syndrome to the second memory array while refraining from transferring the result of the operation to alter the one or more of the plurality of bits of the shifted syndrome to second shift circuitry.

11. The apparatus of claim 9, wherein the apparatus is devoid of shift circuitry other that the shift circuitry.

12. The apparatus of claim 9, wherein the shift circuitry comprises a barrel shifter.

13. The apparatus of claim 9, wherein the first memory array is configured to store a sparse parity-check matrix.

14. The apparatus of claim 9, wherein the second memory array is configured to, prior to receiving the result of the operation to alter the one or more of the plurality of bits of the syndrome, store the syndrome received by the shift circuitry.

15. The apparatus of claim 9, wherein the first memory array is configured to store:
in a row of the first memory array, information corresponding to selection of the syndrome for receipt by the shift circuitry; and
in a column of the first memory array, information corresponding to the shifting indicator corresponding to the syndrome.

16. The apparatus of claim 14, wherein the shifting indicator is determined by performing an arithmetic operation involving numerical values written to at least one row of the first memory array.

17. The apparatus of claim 9, wherein the decision circuitry is configured to transfer the result of the operation to alter the one or more of the plurality of bits of the shifted syndrome to the second memory array in order to reduce an amount of power consumed in operation of a computing system in which the syndrome is processed or to increase a speed at which a decoding operation is performed within the computing system, or both.

18. A system, comprising:
   a first array of memory cells configured to store a plurality of syndromes that each comprise a plurality of bits of data;
   a second array of memory cells configured to store:
      in each respective row of the second memory array, information corresponding to a respective syndrome among the plurality of syndromes; and
      in each respective column of the second array, information corresponding to a respective shifting indicator corresponding to each respective syndrome among the plurality of syndromes;
   first circuitry coupled to the first array and the second array and configured to perform an operation to shift the plurality of bits of one or more of the plurality of syndromes based on the respective shifting indicator that corresponds to the one or more of the plurality of syndromes; and
   second circuitry coupled to the first array and configured to:
      perform an operation to alter one or more of the plurality of bits of the syndromes from a logical value of one to a logical value of zero or from a logical value of zero to a logical value of one; and
      transfer a result of the operation to alter the one or more of the plurality of bits of the syndromes to the first array while refraining from transferring the result of the operation to alter the one or more of the plurality of bits of the syndromes to intervening circuitry.

19. The system of claim 18, wherein the second circuitry is further configured to determine a quantity of errors contained within each of the syndromes based on a quantity of bits having the logical value of one within each of the plurality of syndromes.

20. The system of claim 18, wherein the second circuitry is configured to refrain from transferring the result of the operation to alter the one or more of the plurality of bits of the syndromes to the intervening circuitry in order to reduce an amount of power consumed in operation of a computing system in which the bit string is processed or to increase a speed at which a decoding operation is performed within the computing system, or both.

21. The system of claim 18, wherein the second memory array is configured to store a sparse parity-check matrix.

22. The system of claim 18, wherein each respective shifting indicator is determined by performing an arithmetic operation involving numerical values written to each respective row of the second memory array.

23. The system of claim 18, wherein:
   the first array, the second array, the first circuitry, and the second circuitry are resident on a System on Chip (SoC),
   the first circuitry comprises a barrel shifter, and
   the second circuitry comprises decision circuitry.

24. The apparatus of claim 23, wherein the barrel shifter is an only barrel shifter resident on the SoC.

* * * * *